May 29, 1928.
A. E. DAVENPORT
1,671,814
APPARATUS FOR DISPENSING LIQUIDS
Filed Nov. 8, 1926
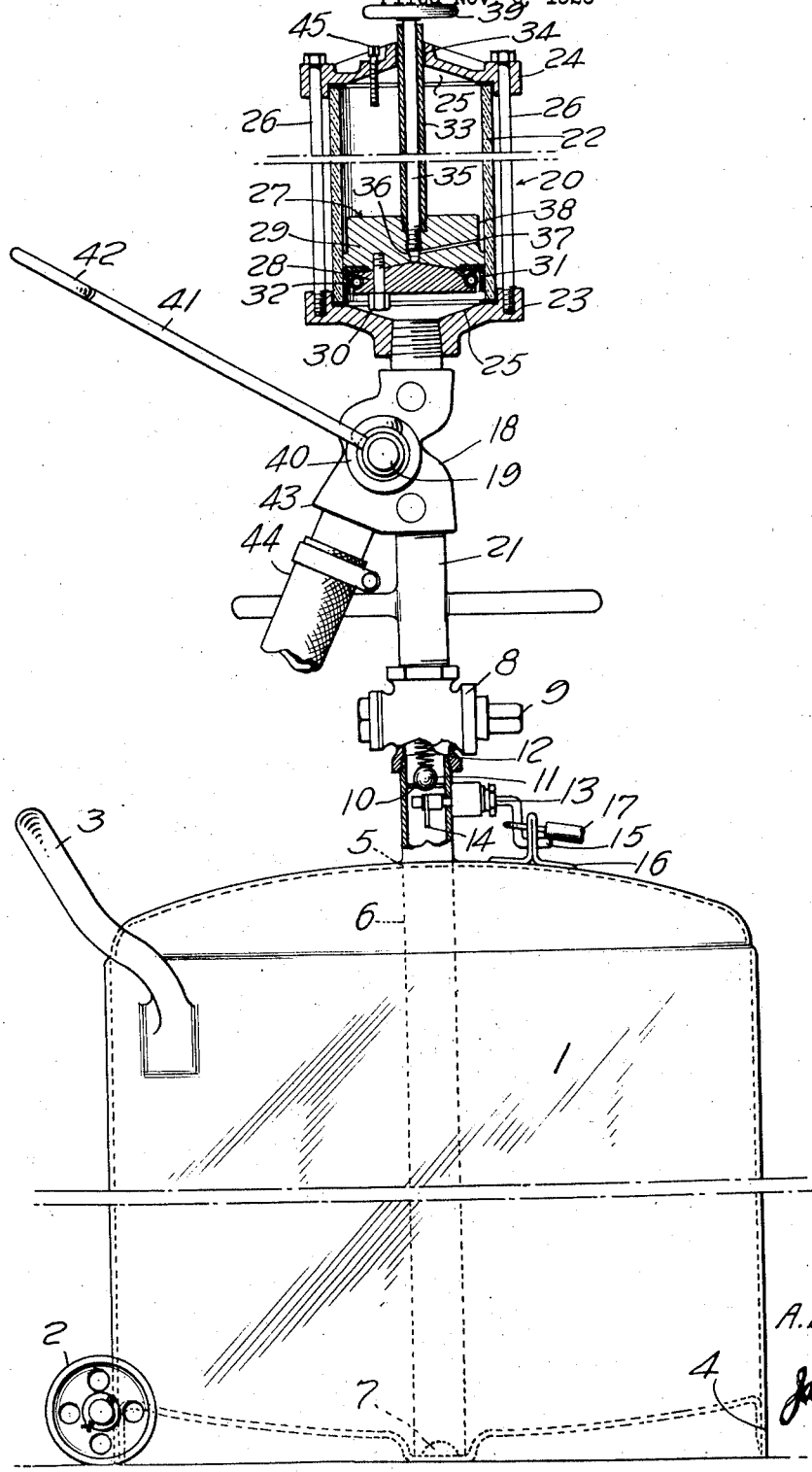
Inventor
A. E. DAVENPORT,
By
Jos H Richmond
Attorney Patented May 29, 1928.

1,671,814

UNITED STATES PATENT OFFICE.

ARTHUR E. DAVENPORT, OF MAYWOOD, ILLINOIS, ASSIGNOR TO OIL PRODUCTS APPLIANCE COMPANY, OF MAYWOOD, ILLINOIS, A CORPORATION OF ILLINOIS.

APPARATUS FOR DISPENSING LIQUIDS.

Application filed November 8, 1926. Serial No. 147,006.

This invention, while generally directed to the dispensing of liquids, has special utility in connection with the dispensing of lubricating oils.

One object of the invention is to provide for dispensing from predetermined bulk containers of such nature as to insure quantity and quality of product.

Another object is to provide a portable container of the nature indicated, having provision for a pressure medium for alternative use in rejecting or dispensing oil or other liquid.

Another object is to provide for sealing the container to preclude unauthorized refilling or other operation thereof.

Another object is to provide desirable accessories for authorized automatic dispensing of the contents of the container in regulable quantities to suit the requirements of the customer.

Another object is to provide dispensing accessories capable of quick connection to, or disconnection from, the container so that they may be used in conjunction with a number of filled containers in succession, thereby to permit an empty container to be returned to the bulk-filling station for refilling without loss of use of the dispensing accessories.

Another object is to include in the dispensing unit a sight measuring receptacle in which the desired quantity of oil is automatically delivered from the tank or container, and a delivery hose by which the oil from the receptacle is delivered to the customer; the dispensing unit including a valve controlled by the position of the delivery hose to place the container and measuring receptacle into communication or to place the receptacle and hose in communication and cut off the tank.

The invention is illustrated in the accompanying drawings, in which:

The figure is a view in elevation, partly in section, showing the complete assembly.

The improved dispensing apparatus includes a tank 1, designed for the reception of a predetermined quantity of oil and air under pressure available to dispense the oil when the parts are positioned to permit such operation. The tank or container 1 is rendered portable through the agency of wheels 2 and may be moved conveniently through the medium of a handle 3, a rim projection 4 tending to anchor the container when in upright position.

The portable tank or container is provided at its top with an opening 5 penetrated by a delivery pipe 6 leading to the bottom of the container and formed with an inlet 7. The delivery pipe 6 extends beyond the container and is equipped with a valve body 8 containing an ordinary valve cock 9 arranged for manual operation.

Intermediate cock 9 and the tank, the pipe 6 is provided with a valve seat 10, which cooperates with a ball valve 11 to normally close communication to the container, a spring 12 tending to hold the valve on its seat. A valve operating rod 13 has a stuffing box mounting in the wall of the pipe 6 and is provided with a cam 14 adapted on rotation of the rod to elevate the valve 11 from its seat to permit fluid to pass into the tank. The valve rod 13 has a handle 15 arranged to cooperate with a fixed bracket 16, through the medium of a suitable lock 17 to prevent unauthorized refilling of the tank.

The assembly, including the tank, service pipe, valve, and cut-off, constitutes a unit designed to be filled at the bulk filling station or refinery and shipped to the service station. Ordinarily, the tank is filled by opening the cut-off 8, raising the valve 11, and supplying a predetermined quantity of oil to the container by means of a pump. When the requisite quantity of oil has been pumped into the tank, more or less pressure is established by, for example, using the same pump to introduce air under sufficient pressure to dispense the oil in response to service demand.

The dispensing unit includes a three-way valve body 18 containing a three-way valve 19, which supports a sight measuring unit 20. The valve body 18 is connected through a union 21 to the cutoff 8, so that, dependent upon the position of the valve 19, there is free flow from the tank to the receptacle 20 when the cut-off 8 is open.

The measuring unit 20 includes a cylinder 22 of glass or other transparent material secured by headers 23 and 24 which are recessed at 25 and suitably packed to received the ends walls of the cylinder, tie rods 26 maintaining a leak-proof connection. The cylinder is provided with a sectional piston 27 comprising lower and upper sections 28 and 29 secured by bolts 30.

A cup packing 31 is secured between them and a coil spring 32 serves to hold it in proper relation to the inner wall of the cylinder. The piston is provided with a hollow rod or spindle 33 guided in an opening 34 in the cylinder head 24. A needle valve 35 mounted in the spindle cooperates with a seat 36 forming one terminal of an air relief, channel 37 extending radially through the piston section 29 and then vertically thereof as at 38. The needle valve may be manipulated at a point beyond the cylinder by a handle 39. It provides for the relief of excessive air pressure in the cylinder, for example when the tank 1 is near depletion, although ordinarily such relief is or may be afforded through the opening in the cylinder head 24.

The three-way valve 19 is controlled through the medium of a spring 40 which normally tends to hold the valve in position to establish communication between the tank and the measuring receptacle 20. The valve is provided with a long operating handle 41 terminating in a fork end 42. The valve body 18 has an outlet 43 to which is connected a service hose 44. The hose nozzle, which as usual may be of the positive shut-off type, when engaged in the fork 42 of the handle serves to support the hose and impose the weight thereof on the handle. The parts are so constructed and arranged that when the hose is suspended as stated, the valve will be turned to cut off communication between the tank and the receptacle 20 and to establish communication between the latter and the hose. Under such conditions, and responsive to pressure, oil will flow from the tank to the measuring receptacle. The latter is provided with an adjustable element 45, the advance or retraction of which controls the limit of movement of the piston and thus regulates the quantity of oil to be dispensed. The element 45 may be calibrated or otherwise formed to adapt it as a measuring device. When the nozzle end of the hose is removed from the handle 41 to delivery, piston valve 19 is operated by the spring 40 to cut off communication between the latter and the hose. Thus the customer's demand will be taken care of without further sacrifice of pressure. When the hose is restored to the handle, the movement thereof under the added weight causes the valve 19 to again establish communication between the tank and the measuring receptacle, and the latter to be filled automatically to the extent of piston movement permitted by the stop 45.

When the tank is empty, it is to be returned to the bulk filling station for refilling. For this purpose, it will be disconnected at the cutoff 8. Thus the dispensing unit at the service station may take on filled tanks one after the other, while the empty tanks with only the necessary parts, to insure authorized filling, are returned to the bulk filling station.

It will be apparent from the above that the delivery of oil from the tank to the measuring receptacle, and from thence through the hose, is entirely automatic, with the particular path of flow controlled by the position of the nozzle end of the hose.

Having described my invention, I claim:

1. A liquid dispensing apparatus including a tank to store a predetermined quantity of liquid under pressure, a delivery pipe leading to the bottom of the tank and extending above the same, an outwardly-opening valve arranged in said conduit, means for normally holding the valve seated to prevent unauthorized recharging of the tank, means for unseating the valve to permit tank recharging, and means for locking the last named means in a position to permit free function of the valve seating means.

2. A liquid dispensing apparatus including a container to store a predetermined quantity of liquid under pressure, a delivery pipe leading to the bottom of the container and extending above the same, a spring seated valve arranged in said pipe to close the container against ingress, means for unseating the valve at will to permit ingress of fluid to the container, and means for locking the unseating means in a position to admit of normal closing function of the valve.

In testimony whereof I affix my signature.

ARTHUR E. DAVENPORT.